United States Patent Office 2,747,467
Patented May 29, 1956

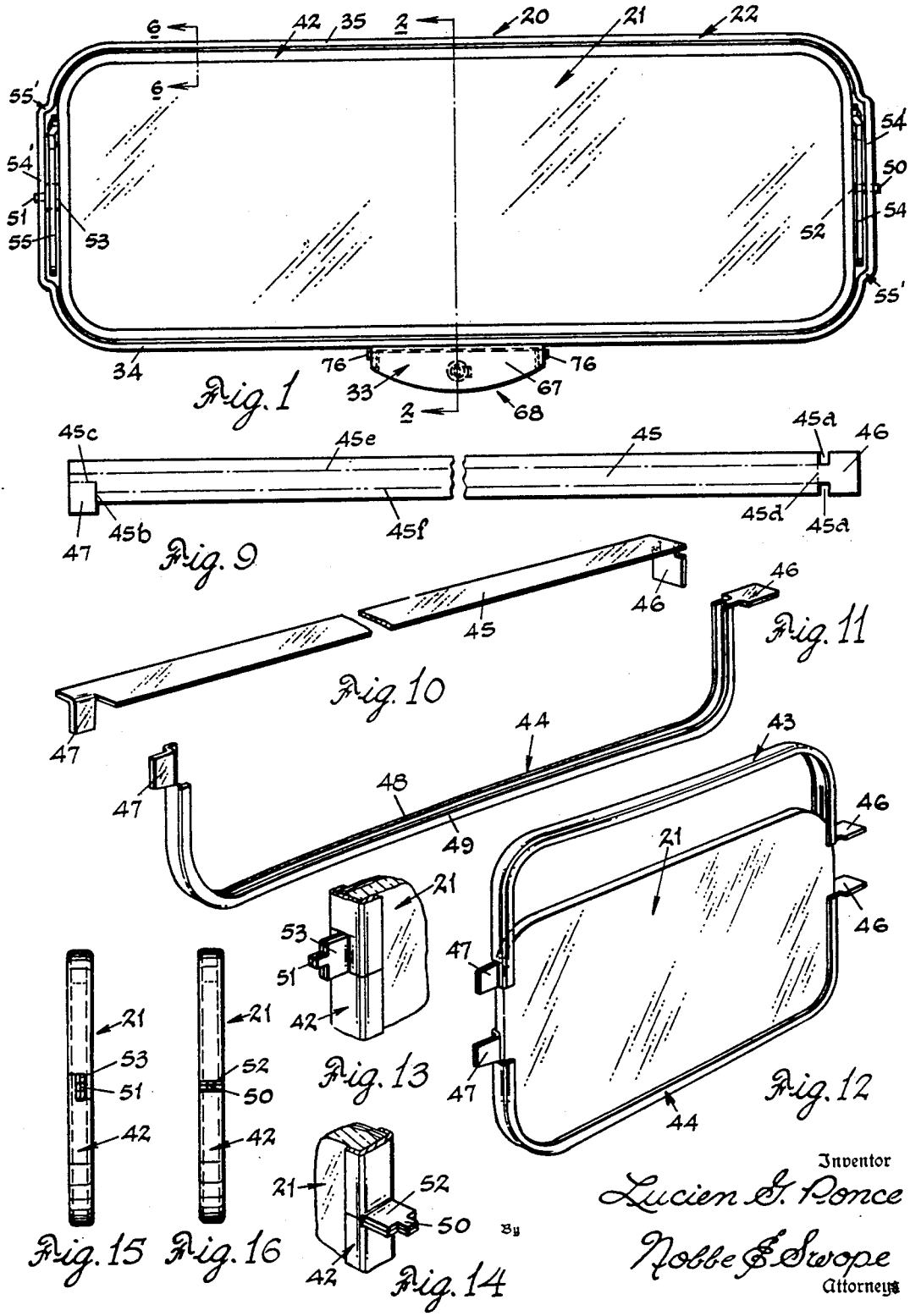

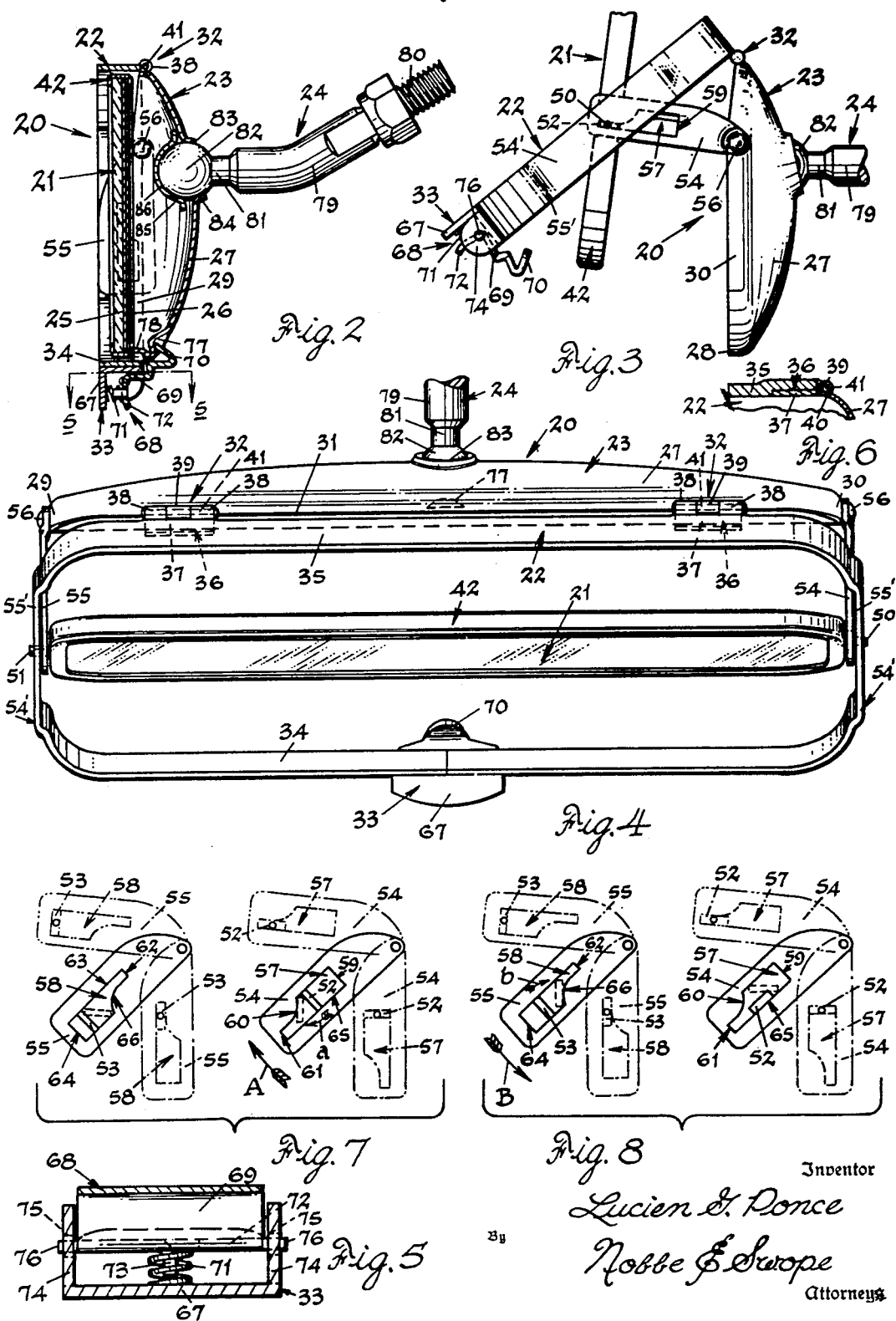

2,747,467

MOUNTING FOR REARVIEW MIRRORS

Lucien G. Ponce, Hancock, W. Va., assignor to Libbey-Owens-Ford Glass Company, Toledo, Ohio, a corporation of Ohio Application June 29, 1950, Serial No. 171,108

4 Claims. (Cl. 88—77)

The present invention relates broadly to rear view mirrors such as are used in automobiles and the like, and more particularly to a reversible rear view mirror adapted for day and night driving.

Generally stated, this type of rear view mirror comprises a mirror element having two reflecting surfaces of different reflectivities and being reversible so that either reflective surface may be brought into operative viewing position by the driver of the vehicle, one reflective surface being preferably in the form of a mirror for use in day driving and the other providing a mirror for night driving which will reduce the brilliance of the reflected headlights of an automobile approaching from the rear.

In an application filed of even date herewith by Ferdinand J. Mazur and Lucien G. Ponce, Serial No. 171,052, there is disclosed a reversible rear view mirror of the above general character comprising essentially a supporting case including a rear wall provided with mounting means therefor and open at the front thereof, a frame hingedly connected to the case, a mirror element normally closing the front of said case and having two reflective surfaces of different reflecting values, means being carried by the mirror element at its opposite ends for rotatably supporting the same within said frame, and actuating arms pivotally carried by the case and operatively connected to and coacting with the mirror element supporting means for effecting rotation and reversal of the mirror element when the frame is swung forwardly and rearwardly relative to the case.

An important object of this invention is the provision, in a reversible rear view mirror of the above character, of novel and improved means for carrying the mirror element and for rotatably supporting the same within the swinging frame of the mirror assembly.

Another object of the invention is to provide, in a rear view mirror of the above character, supporting means of such character and associated with the mirror element in such a manner as to strengthen and protect the same from chipping or breakage and which also obviates the necessity of drilling or notching the mirror element to secure the same thereto.

Another object of the invention is to provide, in a rear view mirror of the above character, supporting means for the mirror element in the form of a bezel that completely surrounds the edges of said mirror element and has formed as a part thereof the means for rotatably supporting the mirror element within the hinged frame.

A further object of the invention is to provide a bezel for carrying the mirror element that is fabricated of two complementary sections shaped to fit around the edges of said mirror element and to be secured together to form a unitary structure, the means securing the complementary bezel sections together also serving to rotatably support the mirror element within the hinged frame and having portions coacting with the actuating arms to automatically reverse the mirror element when the frame is swung relative to the mirror supporting case.

A still further object of the invention is to provide a novel method of fabricating the complementary sections of the bezel for the mirror element and for securing them in surrounding relation thereto.

Other objects and advantages of the invention will become more apparent during the course of the following description when taken in connection with the accompanying drawings.

In the drawings, wherein like numerals are employed to designate like parts throughout the same:

Fig. 1 is a front view of a reversible rear view mirror constructed in accordance with the invention;

Fig. 2 is a vertical transverse section through the mirror taken substantially on line 2—2 of Fig. 1;

Fig. 3 is an end view of the mirror in open position and during reversal of the mirror element;

Fig. 4 is a top view of the mirror with the parts thereof located in their open or outermost positions;

Fig. 5 is a detail section of the latch for the mirror element taken substantially on line 5—5 of Fig. 2;

Fig. 6 is a detail section taken substantially on line 6—6 of Fig. 1;

Figs. 7 and 8 are graphic views of the actuating arms illustrating diagrammatically the relation of their movements to effect rotation of the mirror element;

Fig. 9 is a plan view of a metal blank forming one section of the supporting bezel for the mirror element;

Fig. 10 is a perspective view of the metal blank after being partially fabricated;

Fig. 11 is a perspective view of one of the finished bezel sections;

Fig. 12 is a perspective view of the mirror element illustrating the manner in which the complementary sections of the bezel are associated therewith;

Fig. 13 is a fragmentary perspective view of one end of the completed bezel showing the supporting means for the mirror element;

Fig. 14 is a similar perspective view of the opposite end of the bezel;

Fig. 15 is a view of one end of the mirror element with the bezel applied thereto; and Fig. 16 is a view of the opposite end of the mirror element.

Referring now to the drawings, and particularly to Figs. 1 to 4, there is illustrated a reversible rear view mirror designated in its entirety by the numeral 20 and constructed in accordance with this invention. The rear view mirror 20 comprises generally a mirror element 21 which is rotatably carried in a swingable frame 22 hinged at its upper edge to a supporting case 23. A mounting bracket 24, carried by the case 23, is provided for attaching the mirror to the framework of an automobile.

The mirror element 21, as here shown, is of substantially rectangular form and may be of glass, plastic, or other suitable transparent and/or opaque material of suitable thickness. Preferably, the mirror element is of transparent glass and is provided upon one surface thereof with reflecting coatings 25 and 26, which may be applied or obtained by any suitable or preferred method; either as shown on one side of the mirror element; or on opposite sides thereof, or by applying a reflecting film to one surface and employing the natural low reflectivity of the glass as the second reflecting surface. These reflecting surfaces, however obtained, are provided to secure alternately and at will a high reflectivity for daytime driving and a lower reflectivity more desired for nighttime driving.

More particularly, the mirror element 21 may carry a film of high reflecting power to provide the mirror surface 25 and a film having a lower reflecting power to furnish the mirror surface 26. In the preferred form, the high reflecting mirror film 25 is in contact with a transparent mirror element 21 and the other mirror film 26 superimposed upon the outer surface of film 25. A useful construction may, however, also be formed with the mirror film 26 in contact with element 21 and with the higher reflecting film 25 superimposed thereon.

The mirror element 21 is carried for rotatable movement in the frame 22 which is of corresponding rectangular outline and hingeably associated with the supporting case 23. The case 23 is also substantially rectangular in outline and complementary to the mirror element 21 and frame 22. The case comprises a back wall 27 that is arcuately curved through both of its axes, as shown in Figs. 2 and 4, said wall being shaped to provide a forwardly directed flange 28 along the bottom thereof and forwardly directed flanges 29 and 30 at its opposite ends. Thus, the case 23 is of so-called "dished" formation having a bottom wall 28 and end walls 29 and 30, which merge at their upper ends into the upper marginal edge 31 of the back wall 27.

The frame 22 is hinged to the case 23 along its upper marginal edge 31 by means of the hinges generally indicated at 32, whereby the frame can be swung forwardly and upwardly away from the case or positioned so as to encircle the walls 28, 29 and 30 thereof when the mirror element 21 is located in viewing position as in Fig. 2.

The frame 22 may be formed or shaped from suitable metal, such as aluminum, bent into substantially rectangular form and having the ends thereof secured in abutting relation by means of an angle plate 33 to which said ends are anchored as by welding, rivets, or the like. Preferably, the secured ends are arranged in that part of the frame which forms the bottom wall 34 thereof so that the angle plate 33 may be located intermediate the ends of the frame to serve as a finger grip as will be more fully hereinafter described.

The upper wall 35 of the frame 22 is provided in its under surface and adjacent its opposite ends with depressions 36 in which are secured, as shown in Fig. 6, plates 37 having pairs of journal portions 38 that form a part of the hinges 32. Each pair of journals 38 receives a central journal 39 therebetween, the journal 39 being formed by a tongue 40 extending outwardly from the upper marginal edge 31 of supporting case 23. Pintles 41 pass through the journals 38 and 39 and thus swingably interconnect the frame to the supporting case so that it can be swung to a closed position, as shown in Fig. 2, to locate the mirror element 21 in viewing position; or to an open position as shown in Fig. 3 wherein the mirror element is located for rotation and reversal.

The mirror element 21 is carried by and rotatably supported in the hinged frame 22 by means of a bezel 42. This bezel is composed of two complemental, substantially U-shaped sections 43 and 44 of channel formation in cross section which fit around the edges of the mirror element to completely surround the same and are secured together at their meeting ends to form a unitary structure. The means securing the bezel sections together also constitutes the supporting means for the mirror element and a part of the means for automatically effecting the rotation and reversal of the mirror element as will be more fully hereinafter described.

Each of the bezel sections 43 and 44 is fabricated from a metal blank of the form shown in Fig. 9. This blank consists of a relatively long narrow strip of metal having an elongated body portion 45 of uniform width provided at its opposite ends with specially formed tongue portions 46 and 47. The tongue 46 may be obtained by cutting out equal rectangular notches 45a from opposite edges of the metal strip inwardly of one end thereof to form said tongue which projects outwardly in alignment with the longitudinal axis of the body portion 45. The tongue 47 at the opposite end of the strip projects laterally beyond one side edge of the body portion 45 so that it is relatively wider than the same. The width of the tongue 47 is the same as the width of tongue 46 and is defined by an entering cut 45b extending transversely of the strip from one side edge to approximately the medial line 45c thereof. The length of the tongue 47 from the medial line 45c to the outer edge thereof is also equal to the length of the tongue 46. Thus, the tongues 46 and 47 are of substantially the same length and width except that tongue 46 extends longitudinally of the blank while tongue 47 is arranged transversely thereof.

The tongues 46 and 47 are then bent laterally of the body portion 45 in the same direction as shown in Fig. 10 so as to be disposed at substantially right angles thereto and also to one another. More specifically, the tongue 46 is bent along line 45d while tongue 47 is bent along line 45c. When this is done, the width of the tongue 46 will be disposed transversely with respect to the longitudinal axis of the body portion 45 while the width of tongue 47 will be disposed parallel with said body portion and substantially on the medial line thereof.

After the tongues 46 and 47 have been bent laterally, as in Fig. 10, the metal blank is shaped to form one of the substantially U-shaped bezel sections 43 or 44. This is accomplished by bending the body portion 45 of the metal strip longitudinally along spaced parallel lines 45e and 45f to provide a body portion of channel shape in cross section having inwardly directed substantially parallel tongues 48 and 49. Simultaneously, the opposite end portions of the metal strip are bent inwardly to form the substantially U-shaped bezel section as shown in Fig. 11. During this bending operation, the body portion is also bowed slightly inwardly from its normally flat plane as indicated in Figs. 11 and 12 for a purpose to be more fully hereinafter described.

When the bezel section has been completed, it is fitted over one longitudinal edge and one half of the end edges of the mirror element 21 as in Fig. 12. A second bezel section formed as above described is then positioned to engage the opposite longitudinal edge and the other half of the end edges of the mirror element so that the two sections will cooperate to completely surround the mirror element. When the two sections are applied to the mirror element in this manner, the tongues 46 will abut one another at one end of the mirror element as shown in Fig. 14, while the tongues 47 at the opposite end of the mirror element will be disposed opposite and in overlapping relation to one another as shown in Fig. 13.

The pairs of tongues 46 and 47 are now secured together in their respective abutting and overlapping relation by spot welding or the like, to form an integral structure.

Upon assembling of the bezel sections upon the mirror element, the convex inner surfaces of the body portions 45 thereof will engage the longitudinal edges of the mirror element so that when the bezel sections are secured together, the metal strips will exert a spring pressure upon the edges of the mirror element to hold them tightly in place and to uniformly conform to the contour of the mirror element.

When the bezel sections 43 and 44 are secured to the mirror element in the manner above described, the abutting tongues 46 at one end of the mirror element and overlapping tongues 47 at the opposite end thereof will be in substantial alignment with one another and intermediate the upper and lower longitudinal edges of the mirror element, as well as being disposed at right angles to one another. In accordance with the invention, the tongues 46 and 47 are then sized and shaped to provide trunnions 50 and 51 for rotatably supporting the mirror element within the hinged frame and also actuator portions in the form of rectangular slide bars 52 and 53 for effecting rotation of the mirror upon swinging of the frame relative to the supporting case. As shown in Figs. 12 and 13, the outer corner portions of the tongues are cut away to provide the trunnions 50 and 51 which project outwardly from the slide bars 52 and 53. The corners of the trunnions can also be rounded off to facilitate their rotation within the swinging frame.

In mounting the mirror element 21 within the hinged frame 22, the trunnions 50 and 51 are rotatably received in openings formed in the opposite ends 54 of said frame. Therefore, when the frame is swung outwardly from its closed position in Fig. 2 to its open position in Fig. 3, the mirror element 21 will be carried outwardly and will be rotated on the trunnions 50 and 51 to partially reverse the same, while further rotation of the mirror element will be effected to complete reversal thereof effected upon subsequent inward swinging movement of the frame to return it to closed position in front of the case.

Automatic rotation of the mirror element is accomplished by means of a pair of actuating arms 54 and 55 pivotally supported at their inner ends by rivet pins 56 on the end walls 29 and 30 respectively of the supporting case 23. To accommodate the arms 54 and 55 between the ends 54' of the frame 22 and the bezel 42, the said ends are shaped to form recesses 55' in which the arms will be positioned in close nesting relation to the adjoining members. The arms 54 and 55 are carried at their outer ends on the trunnions 50 and 51 which support the mirror element 21 within the frame 22, so as to be movable therewith. More specifically, the pivots afforded by the rivet pins 56 are located with reference to the hinges 32 to produce a radial motion of the arms 54 and 55 through arcs which are eccentric to the arcs described by the trunnions 50 and 51 when carried radially by the frame 22. The actuating arms 54 and 55 and trunnions 50 and 51 thus actually slide or reciprocate relative to one another, and means is herein provided for utilizing this reciprocal movement to carry out rotation of the mirror element.

The actuating arms 54 and 55 are provided with suitably formed cam slots 57 and 58 through which the trunnions 50 and 51 and the slide bars 52 and 53 project and these slide bars are influenced by the outline of these slots whereby swinging movement of the arms will cause the trunnions and the mirror element carried thereon to be rotated. Thus, the cam-like slots 57 and 58 actively engage the slide bars 52 and 53 that are formed as a part of or from which the trunnions 50 and 51 project from the ends of the bezel 42. The cam outline of the slots 57 and 58 is determined by the relation of the slide bars 52 and 53 therewith and, as previously noted, these bars are arranged at substantially right angles to one another.

The cam slots 57 and 58 in the actuating arms 54 and 55 are designed to have inoperative areas and operative areas that control the action of the slide bars 52 and 53 and consequently the rotation of the mirror element. The slots 57 and 58 in the arms 54 and 55 may also be of a determinable length to control the extent of swinging motion of the frame 22. The inoperative and operative areas of each slot are so disposed within this determinable length that the slide bars 52 and 53 will be carried or acted upon to cause their rotation during the outward and inward swinging movements of the frame.

The cam slots 57 and 58 are of a similar pattern but are reversely arranged in their respective actuating arms, as graphically shown in Figs. 7 and 8, to initiate rotation of the mirror element in sequential and inverse order; one cam slot being effective during outward movement of the frame, and the other cam slot becoming effective during the subsequent inward movement thereof. The slot in either arm may be selected to initiate the rotary motion and, by way of example, the slot 57 in arm 54 will be so described. As will be noted in Fig. 7, the said slot 57 is thus formed to receive the slide bar 52 at the inner end 59 thereof, which end is of sufficient width to accommodate the width of said bar. This width is maintained through substantially one-half of the length of the slot and is then gradually reduced to the thickness of the slide bar by the shaping of the slot along its upper edge as at 60 to provide the operative area. This operative area or cam surface 60 is located so as to turn the slide bar 52 through 90 degrees as the arm 54 is moving forwardly and upwardly and so that said bar will be carried endwise into the narrow end 61 of the slot. While this sequence of operation is occurring, the slide bar 53 is moving from the narrow end area 62 of slot 58, as shown in Fig. 7, along the straight upper edge 63 of the slot 58. As the slide bar 52 is turned to enter the narrow end 61 of slot 54, the slide bar 53 will in like manner be turned in its slot 58. To accommodate the width of the bar 53 as it is turned, the slot 58 is widened accordingly as at 64 so that as the slide bar 52 reaches the narrow end 61 of slot 57, the slide bar 53 will arrive at the wide end of slot 58.

The resultant effect created by the sliding and turning action of the slide bars 52 and 53 in the slots 57 and 58 of actuating arms 54 and 55, respectively, is illustrated in Figs. 7 and 8 wherein the relative movements of the several parts during the outward movement of the frame 22 is diagrammatically shown in Fig. 7 and the corresponding movements of the parts are shown during inward movement of the frame in Fig. 8, the actuating arm 54 being shown at the right in each of the figures and the arm 55 at the left.

Referring particularly to Fig. 7, the actuating arms 54 and 55 are each shown in broken lines in their idle or non-actuating positions and in full lines in actuating position. Now, as the frame 22 is moved outwardly and upwardly, as indicated by the letter A, from the position shown in Fig. 2 toward the position illustrated in Fig. 3, the arms 54 and 55 are likewise swung outwardly and upwardly to and through the position shown in full lines to the upper position indicated in broken lines. During this concurrent motion, the mirror element 21 is carried in an arc which is concentric to the hinges 32, while the arms 54 and 55 are swung in an eccentric arc to move reciprocally relative to the surfaces of the slide bars 52 and 53. However, since there will also be a lifting influence exerted, the slide bar 53 will follow the straight upper surface 63 from the narrow end 62 of cam slot 58 while the slide bar 52 will be brought, as shown in full lines, into engagement with the cam surface 60 of slot 57 in arm 54. This engagement produces, upon continued movement of slide bar 52, a rotating action which, as indicated by the arrow denoted by the letter $a$, is imparted, thereto and as a consequence of which said slide bar is turned substantially a quarter revolution and the mirror element 21 and slide bar 53 are likewise turned. At the upper limit of the outward motion of frame 22, it will be seen that the slide bars 52 and 53 will have reached the narrow end 61 of the slot 57 and the wide end 64 of the slot 58 respectively, and have actually turned to positions at right angles to their starting positions.

During the return downward and inward movement of the frame 22, as indicated by the arrow B in Fig. 8, the actuating arms 54 and 55 are carried from the upper position indicated in broken lines through the positions indicated by full lines and returned to the broken line positions in which the arms are located substantially as in the starting position of Fig. 7. Now, the downward influence imposed by the frame on the mirror element through the trunnions 50 and 51 directs the slide bars 52 and 53 along the bottom surfaces of the cam slots 57 and 58 so that the slide bar 52 traverses the straight surface 65 of cam slot 57 (as shown in full lines) while the slide bar 53 is carried into engagement with the cam surface 66 of cam slot 58 and consequently is caused to rotate as shown by the arrow indicated by the letter $b$.

This continued rotation completes the half rotation of the mirror element 21 so that when it is again located in viewing position, the reflecting surfaces thereof will have been reversed. The slide bar 52 will now be positioned to enter the wide end 59 of the slot 57, while the slide bar 53 will correspondingly be positioned to enter the narrow end 62 of the slot 58, since both slide bars will have turned a further quarter rotation. The forward and rearward swinging movements of the frame 22 may be performed in a rapid manner by the driver of the vehicle to select the desired reflecting mirror surface. This can be accomplished in an efficient convenient manner with a minimum of care and attention on his part and without requiring any subsequent adjustment of the mirror since the same area of the rear view scene is maintained in either of the two reflective surfaces.

The frame 22 is manually operated by means of the angle plate 33 which, as previously pointed out, serves as a finger grip. More particularly, the depending leg 67 of the angle plate 33 is engageable to pull the frame 22 from its closed position with reference to the supporting case 23 and to release a latch which secures said frame in its closed position. This latch, generally indicated by the numeral 68 (Fig. 5) is embodied in a pivotally supported angle plate 69 having an upwardly and forwardly directed latch finger 70, while a coil spring 71 is arranged between the depending leg 72 of the angle plate 69 and the corresponding leg 67 of the angle plate 33 and is carried on a tab 73 struck from the leg 72. The angle plate 69 is pivotally supported between bent ears 74 extending downwardly at the ends of plate 33, said ears being provided with openings 75 for receiving tabs 76 forming end parts of the depending leg 72 of angle plate 69.

When in latched or closed position as shown in Fig. 2, the latch finger 70 is engaged in a notch or depression 77 formed in the back wall 27 of the supporting case 23. Preferably, the lower wall 28 of the case is provided with a struck-up surface area 78 and the end of the latch finger 70 is adapted to ride downwardly on the surface 78 and, under the influence of the spring 71 to snap into the notch 77 to secure the frame 22 against the supporting case 23.

To operate the latch 68, preparatory to swinging the frame 22 outwardly and upwardly, the depending legs 67 and 72 are gripped and squeezed together to compress the coil spring 71 and remove the latch finger 70 from the notch 77. Upon subsequent return movement of the frame, the leg 72 may be slightly released so that the latch finger 70 will be immediately snapped into latching engagement with said notch 77.

Another feature of the rear view mirror herein provided is that the rear wall 27 of the case 23 acts as a cover for the mirror surface facing said rear wall to shield the same from the headlights of oncoming vehicles and thereby prevent incidental reflections in the windshield of the vehicle created by oncoming traffic. Thus, the out-of-vision reflecting surface is normally in a position to receive light rays that may originate in approaching car lights, sunlight, and reflections from either source. These light rays can and will, unless the mirror is shielded therefrom, be reflected back toward the windshield of the vehicle and create disturbing sources of conflicting light or areas of scattered light therefrom which may materially interfere with driving safety and comfort. The rear wall 27 of the case in serving as a cover for the adjacent reflecting surface of the mirror prevents such inicdental reflections. This is particularly important where the rear view mirror is located in a position beneath the forward wall of the top of the vehicle and especially in the newer body styles wherein the center windshield post is dispensed with to achieve an unobstructed one-piece windshield. When either of the reflective surfaces 25 or 26 of the mirror element is thus located out of viewing position, it will be suitably shielded in the invention by the supporting case 23 from reflecting undesirable light and while still positioning the operatively disposed reflecting surface within the driver's range of vision.

The rear view mirror assembly is preferably supported within an automobile by the mounting 24 so that it may be bodily adjusted to any desired angular position to accommodate persons of different height and seating position. One such adjustable mounting comprises an arm 79 having a threaded end portion 80 by which it is attached to the vehicle frame. Opposite the threaded portion, the arm 79 is provided with a reduced shank 81 which terminates in a ball end 82 as shown in Fig. 2. The ball 82 projects through an opening 83 in the rear wall 27 of the supporting case 23 and is mounted in a spherical bearing or seat 84 formed in the wall 27 concentrically with the opening 83. The ball is retained in this seat by a spring metal strap 85 suitably secured to the wall 27 and having a centrally formed bearing surface 86 conforming to and engaging the ball 82. The bearing surfaces 84 and 86 of the wall 27 and metal strap 85, respectively, coact to grip the ball 82 of the mounting arm 79 with sufficient force to maintain the mirror assembly stationary except when it is desired or necessary to adjust the same bodily to accommodate the driver.

In the operation of the mirror to selectively obtain the desired degree of reflectivity from the mirror element 21, it is again emphasized that the necessary extent of swinging motion of the frame 22 is relatively short and is carried out by simply quickly lifting and lowering the frame. To reverse the mirror element, the driver merely grasps the finger grip 68 to swing the frame upwardly and outwardly with reference to the supporting case 23. In so doing, he releases the latch finger 70 from the opening 77 in the case 23. While the frame is being swung outwardly, a similar swinging action is imparted to the actuating arms 54 and 55. Upon such swinging movement of the actuating arms, the slide bars 52 and 53 coact with said arms to effect the reversal of the mirror element in the manner above described.

It is to be understood that the form of the invention herewith shown and described is to be taken as a preferred embodiment of the same, and that various changes in the shape, size and arrangement of parts may be resorted to without departing from the spirit of the invention or the scope of the subjoined claims.

I claim:

1. A reversible rear view mirror, comprising a supporting case including a rear wall provided with mounting means therefore and open at the front thereof, a frame hingedly connected to said case, a mirror element in a position normally closing the front of the case and having two oppositely facing reflective surfaces of different reflecting values, a bezel surrounding the mirror element, means on said bezel rotatably supporting the mirror element in said frame, actuating arms pivotally carried on one end by said supporting case, and cam slots in the other end of said arms receiving said mirror element supporting means, the said mirror element supporting means and cam slots being so formed and related to one another that they coact to cause said bezel and mirror element to rotate in the frame when the frame is swung sequentially outwardly and inwardly relative to said case to reverse the positions of the reflecting surfaces of said mirror element.

2. A reversible rear view mirror, comprising a supporting case including a rear wall provided with mounting means therefor and open at the front thereof, a frame hingedly connected to the top of said case, a mirror element in a position normally closing the front of the case and having two oppositely facing reflective surfaces of different reflecting values, a bezel surrounding the mirror element, means integral with said bezel rotatably supporting the mirror element in said frame and including mirror actuator portions on said mirror element supporting means, actuating arms pivotally carried at one end from the sides of said case, and cam slots in the other end of said arms receiving said mirror actuator portions therein, the said mirror element supporting means and cam slots being so formed and related to one another that they coact to cause said bezel and mirror element to rotate in the frame when the frame is swung sequentially outwardly and inwardly relative to said case to reverse the positions of the reflecting surfaces of said mirror element.

3. A reversible rear view mirror, comprising a supporting case including a rear wall provided with mounting means therefor and open at the front thereof, a frame hingedly connected to the top of said case, a mirror element in a position normally closing the front of the case and having two oppositely facing reflective surfaces of different reflecting values, a bezel surrounding the mirror element, means on the sides of said bezel rotatably supporting the mirror element in said frame, slide bars arranged at right angles to one another on said mirror element supporting means at opposite sides of said bezel, arms pivotally carried at one end from the sides of said supporting case, and cam slots in the other end of said arms and having oppositely disposed cam surfaces receiving and actively engaging said slide bars, the actuating arm and slide bar at one end of the mirror coacting to effect partial rotation of the mirror element as the frame is swung outwardly away from the case while the actuating arm and slide bar at the opposite end of the mirror coact to effect further rotation of the mirror element when the frame is swung inwardly toward the case to effect reversal of the mirror element.

4. A reversible rear view mirror, comprising a supporting case including a rear wall provided with mounting means therefor and open at the front thereof, a frame hingedly connected to the top of said case, a mirror element in a position normally closing the front of the case and having two oppositely facing reflective surfaces of different reflecting values, a bezel surrounding the mirror element and composed of a pair of complementary, substantially U-shaped sections of channel shape in cross section, outwardly projecting tongues formed at the opposite ends of each bezel section arranged at substantially right angles to one another, the tongues at one end of the mirror element being arranged transversely thereof and secured together in abutting relation while the tongues at the opposite end of the mirror element are secured in vertically disposed overlapping relation, said tongues having substantially rectangular portions forming slide bars and trunnions projecting therefrom for rotatably supporting the mirror element in said frame, actuating arms pivotally carried at one end from the sides of said supporting case, and cam slots of determinable lengths in the other end of said arms and having oppositely disposed cam surfaces for receiving said slide bars therein, the actuating arm and slide bar at one end of the mirror coacting to effect partial rotation of the mirror element as the frame is swung outwardly away from the case while the actuating arm and slide bar at the opposite end of the mirror coact to effect further rotation of the mirror element when the frame is swung inwardly toward the case to effect reversal of the mirror element.

References Cited in the file of this patent

UNITED STATES PATENTS

| | | |
|---|---|---|
| 1,503,378 | Reid | July 29, 1924 |
| 1,541,451 | Wallace | June 9, 1925 |
| 1,812,403 | Hammer | June 30, 1931 |
| 1,825,687 | Wilczynski | Oct. 6, 1931 |
| 1,836,354 | Abrams | Dec. 15, 1931 |
| 2,062,646 | Fox | Dec. 1, 1936 |
| 2,307,532 | Murphy | Jan. 5, 1943 |